United States Patent
Wu et al.

(10) Patent No.: US 11,269,997 B2
(45) Date of Patent: Mar. 8, 2022

(54) AUTOMATED DYNAMIC SECURITY TESTING

(71) Applicant: SAP SE, Walldorf (DE)

(72) Inventors: Yu Wu, Burlingame, CA (US); Siming Yao, Shanghai (CN); Chu Yunxiao Zhong, Shanghai (CN); Xiaoxiao Gu, Shanghai (CN); Xun Sun, Shanghai (CN); Chen Yang, Shanghai (CN); Liujuan Xu, Shanghai (CN)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 16/539,338

(22) Filed: Aug. 13, 2019

(65) Prior Publication Data

US 2021/0049267 A1 Feb. 18, 2021

(51) Int. Cl.
  *G06F 7/04* (2006.01)
  *H04N 7/16* (2011.01)
  *G06F 21/55* (2013.01)
  *G06F 21/54* (2013.01)
  *G06F 21/51* (2013.01)

(52) U.S. Cl.
  CPC .......... *G06F 21/554* (2013.01); *G06F 21/51* (2013.01); *G06F 21/54* (2013.01); *G06F 21/552* (2013.01)

(58) Field of Classification Search
  CPC ...... G06F 21/554; G06F 21/54; G06F 21/552; G06F 21/51; G06F 21/57
  See application file for complete search history.

(56) References Cited

U.S. PATENT DOCUMENTS

| | | | |
|---|---|---|---|
| 9,934,378 B1 * | 4/2018 | Hotta | G06F 16/9535 |
| 2014/0201843 A1 * | 7/2014 | Hibbert | G06F 21/577 |
| | | | 726/25 |
| 2016/0078221 A1 * | 3/2016 | Kaplan | G06F 21/6245 |
| | | | 726/25 |

\* cited by examiner

*Primary Examiner* — Trong H Nguyen
(74) *Attorney, Agent, or Firm* — Mintz Levin Cohn Ferris Glovsky and Popeo, P.C.

(57) ABSTRACT

A method, a system, and a computer program product for performing automated dynamic security testing. A generation of one or more requests is detected. The requests are generated by one or more user devices. A determination is made that the requests are associated with execution of a monitored software application. The determined requests are transmitted to one or more servers for executing a security scanning of the requests. The security scanning of the determined requests is executed to determine presence of one or more security threats associated with execution of the requests. A report of the execution of the security scanning is generated.

14 Claims, 12 Drawing Sheets

FIG. 3c

AUTOMATED DYNAMIC SECURITY TESTING

TECHNICAL FIELD

This disclosure relates generally to data processing and, in particular, to automated dynamic security testing of software applications.

BACKGROUND

Many companies rely on software systems, components, applications, etc. in conducting their daily activities. Examples of such software systems include email, word processing applications, internet browsing applications, financial software applications, sales applications, and/or many other types of software systems. Software is typically used by individuals to perform a variety of tasks and can involve vast amounts of data being generated, exchanged, manipulated, stored, etc. Ensuring that software applications do not contain threats, viruses, security vulnerabilities, etc. is important to continued operation of various processes, applications, etc.

SUMMARY

In some implementations, the current subject matter relates to a computer implemented method for performing automated dynamic security testing. The method may include detecting a generation of one or more requests, the requests being generated by one or more user devices, determining that the requests are associated with execution of a monitored software application, transmitting the determined requests to one or more servers for executing a security scanning of the requests, executing the security scanning of the determined requests to determine presence of one or more security threats associated with execution of the requests, and generating a report of the execution of the security scanning.

In some implementations, the current subject matter may include one or more of the following optional features. In some implementations, one or more plug-in components may be configured to perform the detecting of the generation of the one or more requests.

In some implementations, the requests may include a hypertext transfer protocol request and the monitored software application may be a web application.

In some implementations, the method may further include graphically displaying the generated report. The generated report may be displayed using a security portal communicatively coupled to the one or more servers.

In some implementations, the method may also include selecting a server to perform the executing of the security scanning of the determined requests to ascertain presence of one or more security threats associated with execution of the requests. At least one of the detecting, the determining, the transmitting, the executing, and the generating may be performed automatically.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3c illustrates an exemplary report that shows that various threats/vulnerabilities have been identified, according to some implementations of the current subject matter;

DETAILED DESCRIPTION

One or more implementations of the current subject matter relate to methods, systems, articles of manufacture, and the like that may, among other possible advantages, provide an ability to automate dynamic security testing of software applications.

Conventional dynamic application security testing (DAST) tools typically include a software application that communicates with a web application to identify potential security vulnerabilities in the web application and architectural weaknesses. The DAST tool typically does not have access to a source code and thus, detects susceptibilities by actually performing attacks. The DAST tools detect weaknesses of the web application with minimal user interactions once configured with host name, crawling parameters and authentication credentials. The weakness are detected in query strings, headers, fragments, verbs (GET/POST/PUT) and DOM injections. Further, such web application scanners look for a wide variety of vulnerabilities, such as input/output validation, e.g. cross-site scripting and SQL injection, application problems, server configuration errors, etc.

Figure 1:
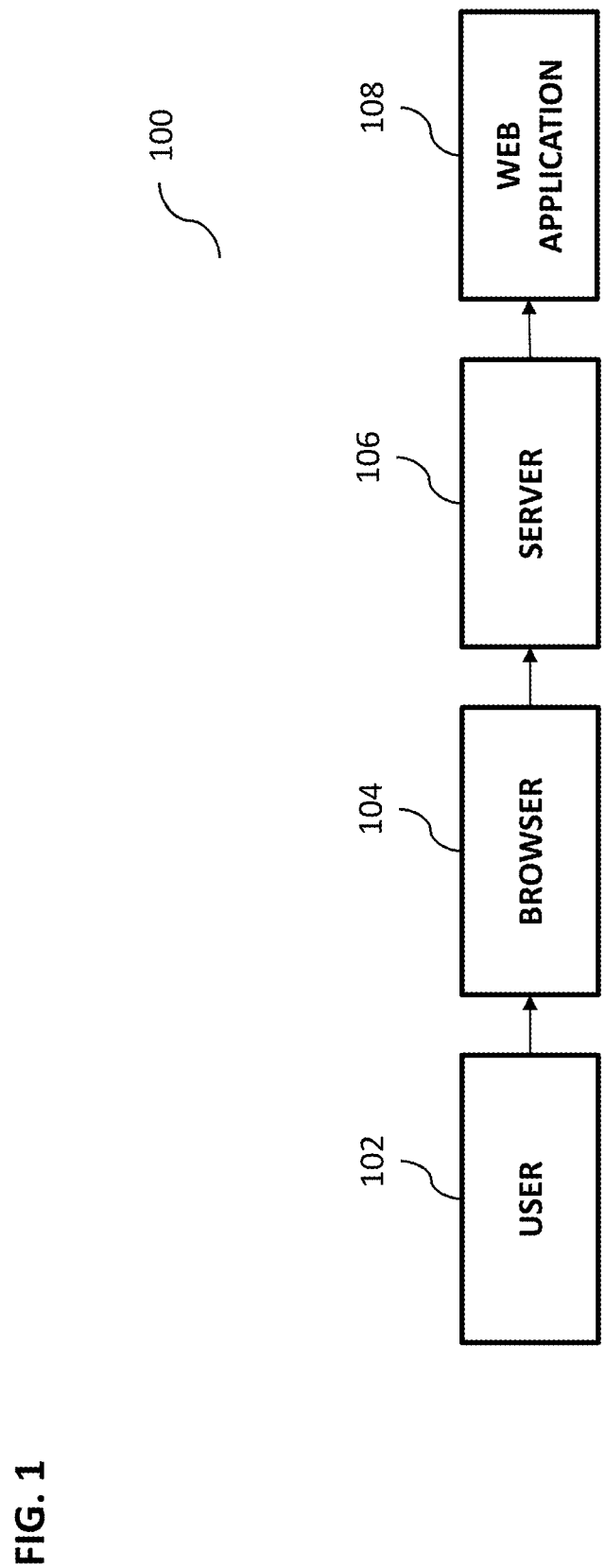
FIG. 1 illustrates an exemplary dynamic application security testing system.

FIG. 1 illustrates an exemplary dynamic application security testing system 100. The system 100 includes a user 102 (e.g., an individual, a software application, a software process, etc.), a browser 104 (e.g., FireFox browser, Internet Explorer browser, etc.), a server 106 (e.g., a BURP suite for testing security of software applications), and a web application 108.

To perform dynamic application security testing, the user 102 submits a request (e.g., HTTP) to the browser 104 to access the web application 108. The server 106 then performs security testing using the DAST tools. Some of the existing security testing tools implement a web crawler to "crawl" the web application 108. This approach may be cumbersome for applications that include a large number of functions, workflows, etc., as security testing is performed function by function. Further, crawling can also take a substantial amount of time. Moreover, crawling the application does not provide any assurances that specific functions have been security testing, thereby potentially exposing users to security threats.

Other existing security testing tools involve manual capture of function requests using a security scanner. As shown in FIG. 1, the browser 104 may be configured to catch such function requests and the server 106 may be configured to perform appropriate security testing. However, this approach requires a substantial amount of expert knowledge of functions and is not scalable. Unfortunately, expert knowledge is not always available and might not cover all functions. Further, security expert knowledge may also be required to analyze any security test scan results and identify security threats.

In some implementations, the current subject matter provides a dynamic application security testing function coverage that allows automatic collection and testing of application requests. Such approach does not require expert knowledge of functions or time to perform security testing. In particular, the current subject matter system may include a security service portal for automating security scanning and testing as well as generation of a report that includes results of the scans/tests. In some implementations, the current subject matter may be configured to receive and scan the collected requests (e.g., HTTP) from an application browser (e.g., a web browser), distribute collected requests to a dynamic scan server for scanning/testing, and display a status of the scanning/testing processes as well as results of the scanning/testing. The report may be used to audit identified vulnerabilities and determine resolution. The current subject matter may also transmit notifications to users when the scanning/testing processes are started and completed (e.g., via a graphical user interface that may be provided in the user's system).

Figure 2:
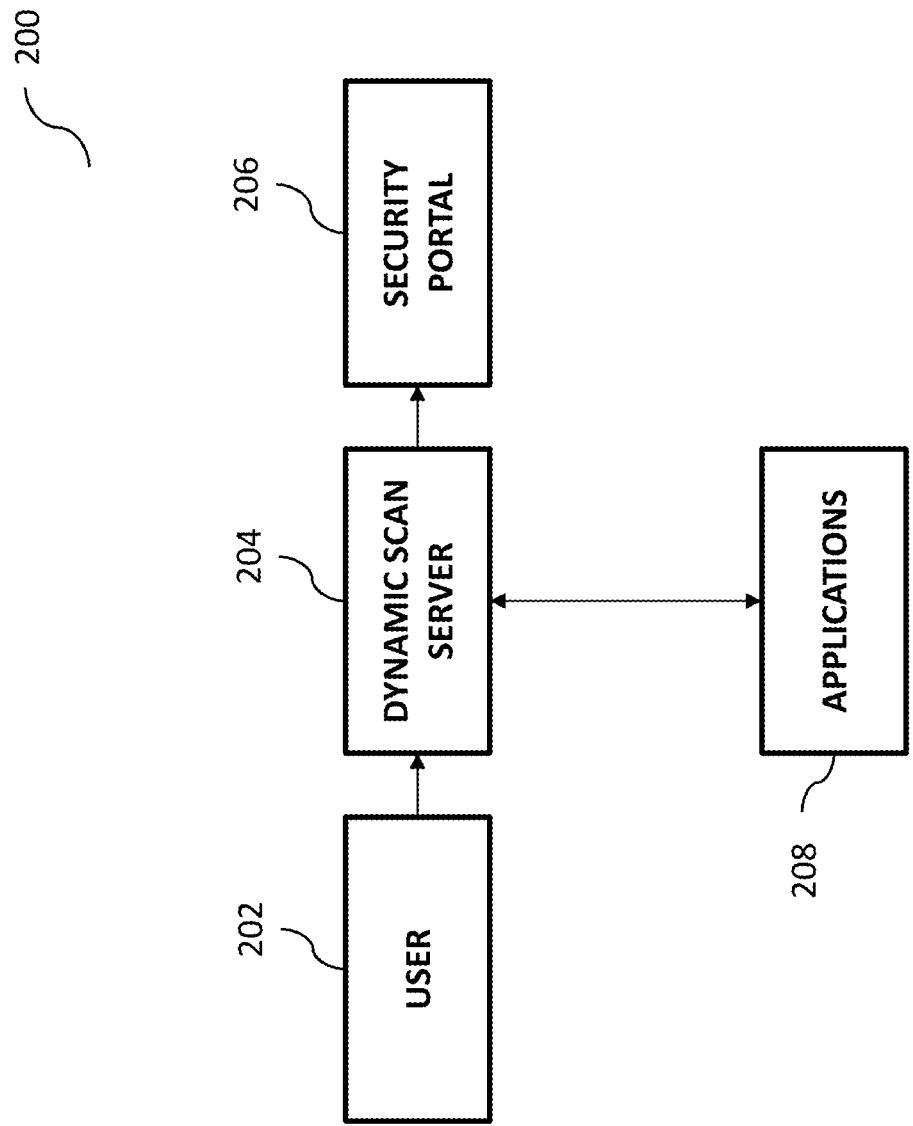
FIG. 2 illustrates an exemplary system for performing automated dynamic application security testing, according to some implementations of the current subject matter.

FIG. 2 illustrates an exemplary system 200 for performing automated dynamic application security testing, according to some implementations of the current subject matter. The system 200 may include a user 202 (e.g., an individual user, a browser plug-in, a software application, an application process, an application plug-in, a computing system, etc.), a dynamic scan server 204, a security portal 206, and one or more applications, instances, etc. processes 208. Components 202-208 may be communicatively coupled using one or more communications networks. The communications networks may include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components 202-208 may include any combination of hardware and/or software. In some implementations, components 202-208 may be disposed on one or more computing devices, such as, server(s), database(s), personal computer(s), laptop(s), cellular telephone(s), smartphone(s), tablet computer(s), and/or any other computing devices and/or any combination thereof. In some implementations, the components 202-208 may be disposed on a single computing device and/or can be part of a single communications network. Alternatively, the devices may be separately located from one another.

A user may access the system 200 via a user device 202. The user device 202 may access and/or execute one or more software applications that may be deployed on the user device 202. In some implementations, the user devices 202 may also include one or more application programming interfaces (APIs) that may be used for providing communication between the user devices 202 and other components 204-208. Additionally, the user devices 202 may include one or more graphical user interfaces (e.g., for displaying results of the scan, etc.). The user devices 202 may also include one or more plug-ins and/or add-ins that may be used for providing communications, execution of various functions (e.g., collection of requests issued by the user), etc. between the user devices 202 and other components 204-208.

As shown in FIG. 2, one or more users using devices 202 may access the system 200. The users can be individual users, computing devices, software applications, objects, functions, and/or any other types of users and/or any combination thereof. The user device 202 may generate an instruction/command (e.g., a request) to access an application, which may be transmitted to the engine 204 to process the request. The instruction/command can be in a form of a query, a function call, and/or any other type of instruction/command. In alternate, implementations, the instructions/commands may be provided using a screen (e.g., using a touchscreen, a stylus pen, and/or in any other fashion), a keyboard, a mouse, a camera, a camcorder, a telephone, a smartphone, a tablet computer, a personal computer, a laptop computer, and/or using any other device. The user device 202 may generate the command automatically and/or manually. Based on the command, the server 204 may perform various functions associated with application security testing, as discussed below.

In some exemplary, non-limiting, implementations, the user device 202 may include a request collector (e.g., HTTP request) plug-in that may be installed in a user's browser (e.g., Firefox browser, an Internet Explorer browser, etc.). The plug-in may be configured to monitor and collect user-issued requests for transmission to the scan server 204. The requests may be associated with various applications, instances, etc. 208 (e.g., credit card payment services, video hosting services, etc.) that the user desires to access. In some implementations, the plug-in may be a web extension for collecting HTTP requests and uploading collected requests to the dynamic scan server 204 for performing dynamic scans. Moreover, scan domain and/or blacklist type (e.g., requests, function calls, etc. identified as security threats) may be specifically configured using the plug-in.

Figure 3A:
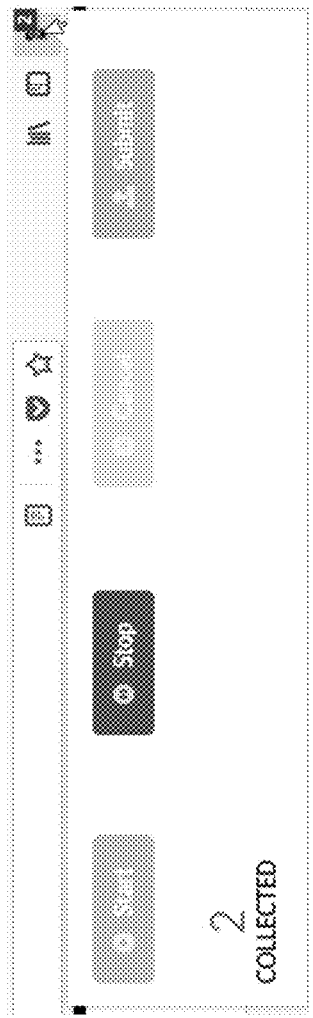
FIG. 3a illustrates an exemplary graphical user interface associated with the plug-in, according to some implementations of the current subject matter.

FIG. 3a illustrates an exemplary graphical user interface 300 associated with the plug-in. The interface 300 may include an indication of a number of requests collected by the plug-in (e.g., "2 collected"). The requests may be transmitted to the server 204 for scanning.

The server 204 may use any means to obtain appropriate data/information for the purposes of application security testing. These means may include any means that may include at least one of the following: a query, a function call, a command, a graphical command (e.g., using a touchscreen, a stylus pen, and/or in any other fashion), a text command (e.g., using a keyboard, a mouse, a smartphone, a tablet computer, a personal computer, a laptop computer, and/or using any other device), and/or any other means. The server 204 may also be communicatively coupled to various public and/or private databases and/or servers that may store various information that may be useful for the purposes of performing application security testing.

Figure 3B:
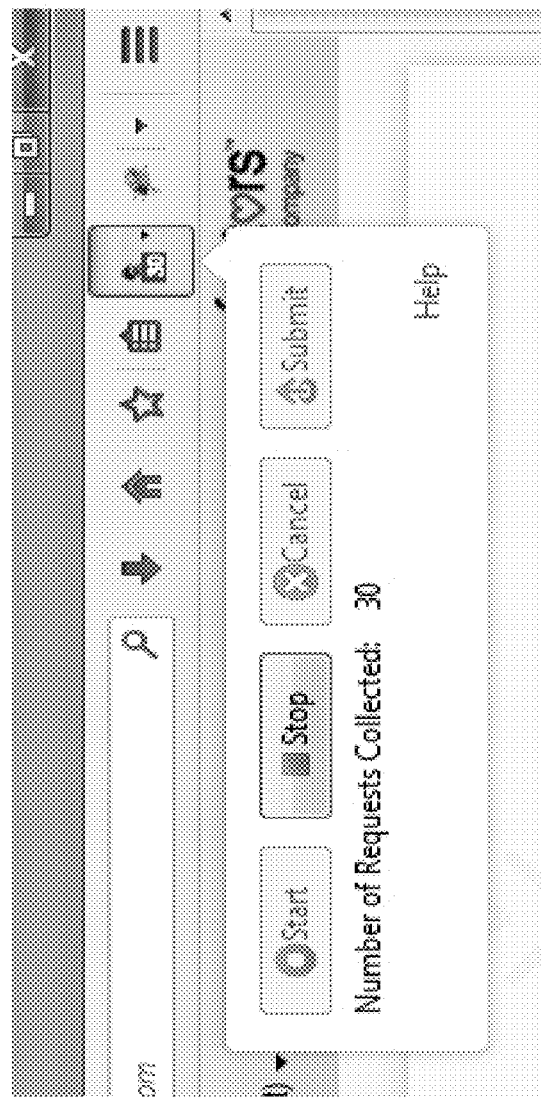
FIG. 3b illustrates another exemplary graphical user interface associated with the plug-in, according to some implementations of the current subject matter.

In some implementations, the server 204 may be a centralized server that may be configured to receive collected requests from the plug-in and perform scanning of the collected requests using a backend scanner tool. Another exemplary plug-in interface 310 is shown in FIG. 3b. The plug-in may be installed in a browser interface and may indicate a number of collected requests (e.g., as shown in FIG. 3b, 30 requests were collected).

Figure 3C:
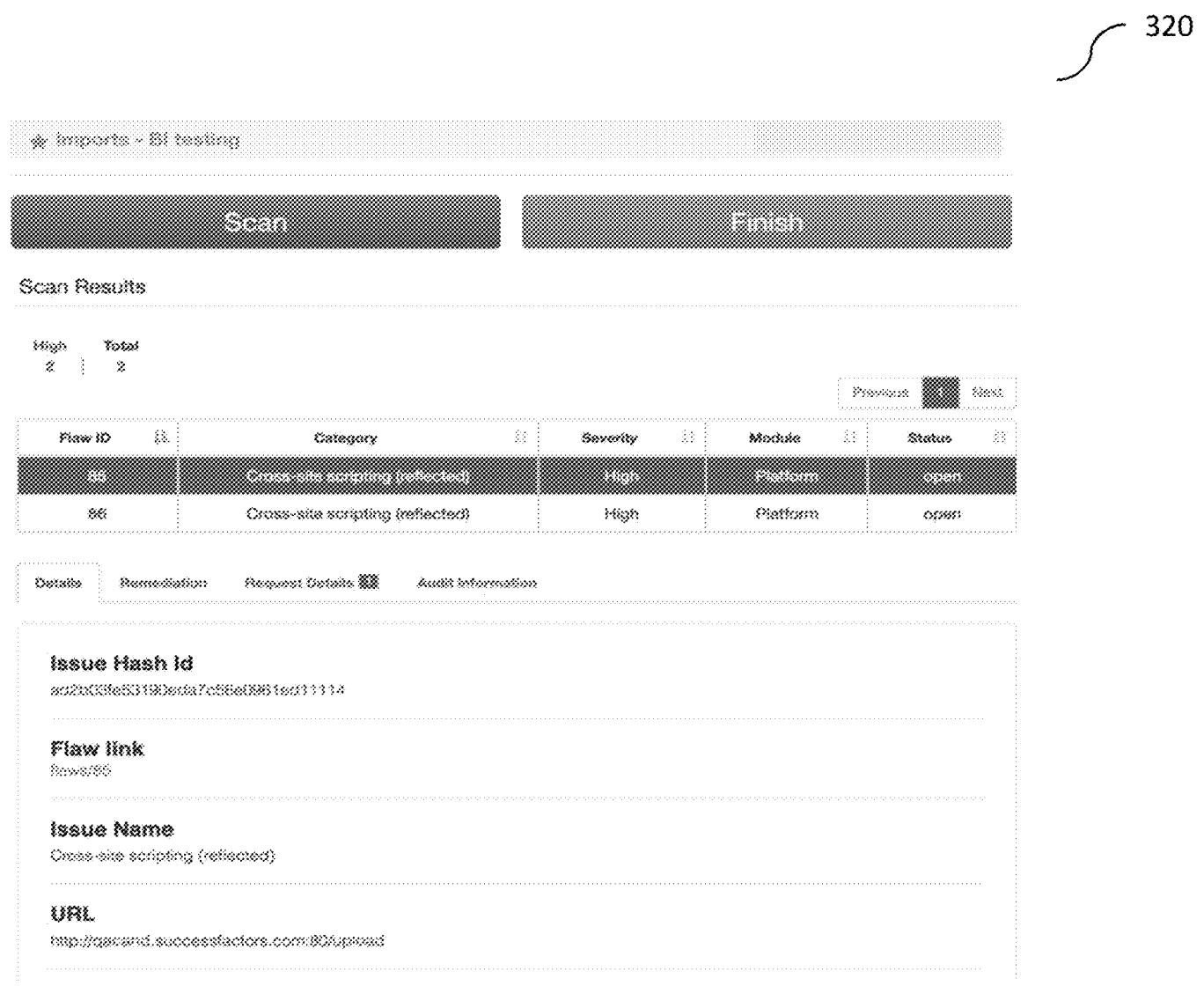

The security portal 206 may be configured to display results of the scanning process. The report may include identification of various vulnerabilities and/or security threats. FIG. 3c illustrates an exemplary report 320 that shows that various threats/vulnerabilities have been identified. In particular, as shown in the report 320, two threats were identified (ID no. 85 and 86) relating to cross-scripting processes. The report may also indicate specific severity, module, and status of each of the identified threats. Selecting one of the threats, further information may also be displayed, e.g., hashID, Flaw Link, Issue Name, and URL.

Figure 4A:
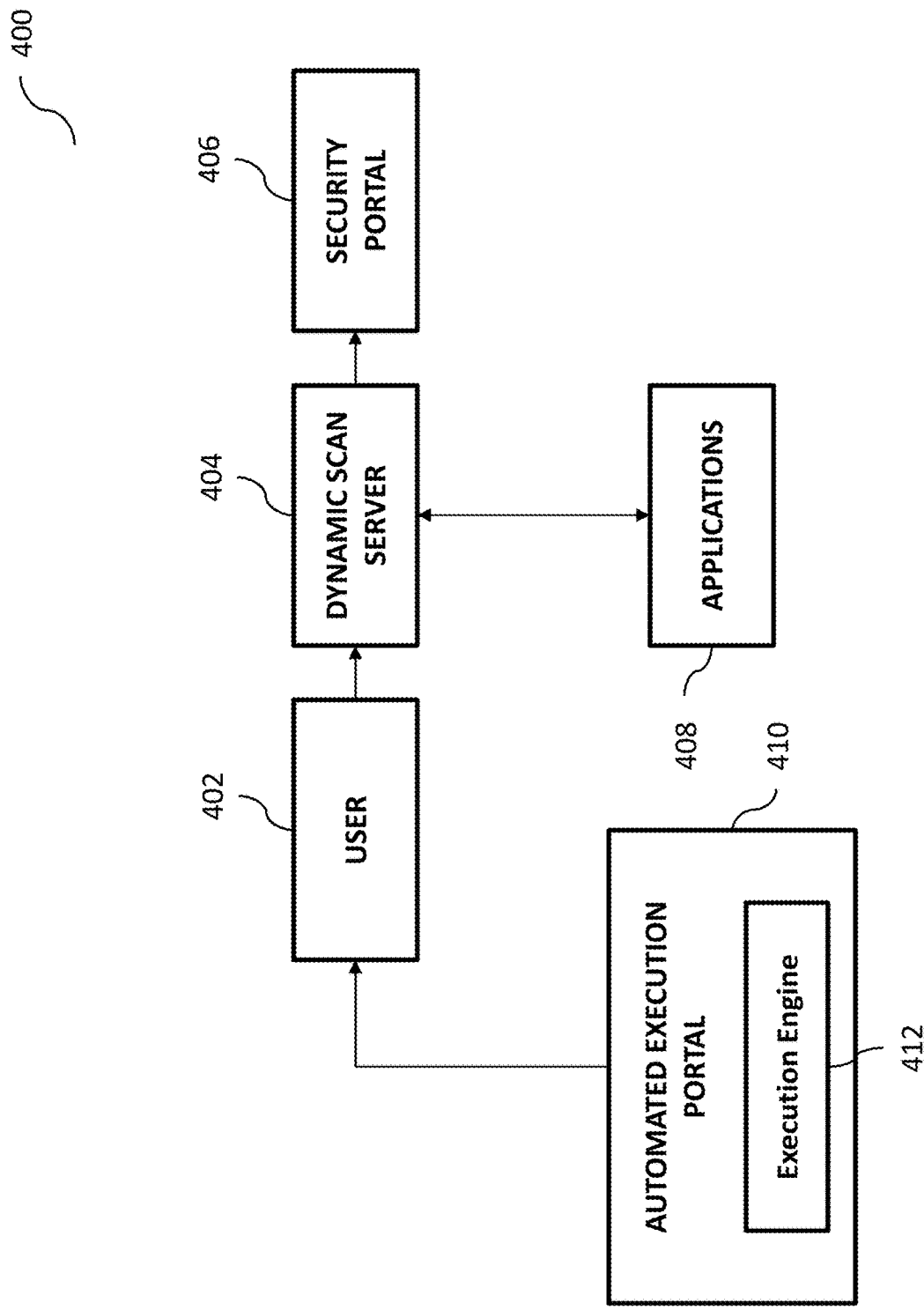
FIG. 4a illustrates an exemplary system for performing automated dynamic application security testing, according to some implementations of the current subject matter.

FIG. 4a illustrates an exemplary system 400 for performing automated dynamic application security testing, according to some implementations of the current subject matter. The system 400 may include a user 402 (e.g., an individual user, a browser plug-in, a software application, an application process, an application plug-in, a computing system, etc.), a dynamic scan server 404, a security portal 406, one or more applications, instances, etc. processes 408, and an automated execution portal 410 that includes an execution engine 412. Similar to FIG. 2, components 402-412 may be communicatively coupled using one or more communications networks. The communications networks may include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof. In some implementations, components 402-412 may include any combination of hardware and/or software. In some implementations, components 402-412 may be disposed on one or more computing devices, such as, server(s), database(s), personal computer(s), laptop(s), cellular telephone(s), smartphone(s), tablet computer(s), and/or any other computing devices and/or any combination thereof.

In some implementations, the automated execution portal 410, along with the user device 402, may be configured to execute various requests (e.g., HTTP requests) for applications 408. By way of a non-limiting example, the automated execution portion 410 may include Selenium portable framework for testing web applications. Such portable framework may be used to configure and automate any scanning processes that may be performed by the dynamic scan server 404. One or more virtual machines may be used for the purposes of execution of the scanning processes.

In some implementations, to enable automation of the scanning processes, the use device 402 may include a plug-in that may perform listening for requests. An example of such listener may include a testNG listener (e.g., an existing testing framework for simplifying various testing needs, e.g., unit testing (i.e., testing a class in isolation), integration testing (i.e., testing entire systems consisting of several classes, several packages, several external frameworks, application servers, etc.). The plugin may be loaded onto the user device's 402 browser and may automatically start collection of application requests once triggering automation processes by the execution engine 412 in the portal 410. The plugin may also stop collection of requests and upload collected requests to dynamic scan server 404 once automation is stopped. The dynamic scan server 404 may include one or more scanning servers, where incoming requests may be distributed among such servers.

In some implementations, when the automation test is started, the testNG listener may notify the plugin by executing a script event (e.g., a javascript event). The plugin may be registered with an event handler to receive the execution of event and trigger an appropriate related action. The testNG listener may execute the script event (e.g., javascript event) at various stages, such as for example: onTestSuccess, onTestFailure, onTestSkipped, etc. An exemplary listener is illustrated in Appendix A.

Figure 4B:
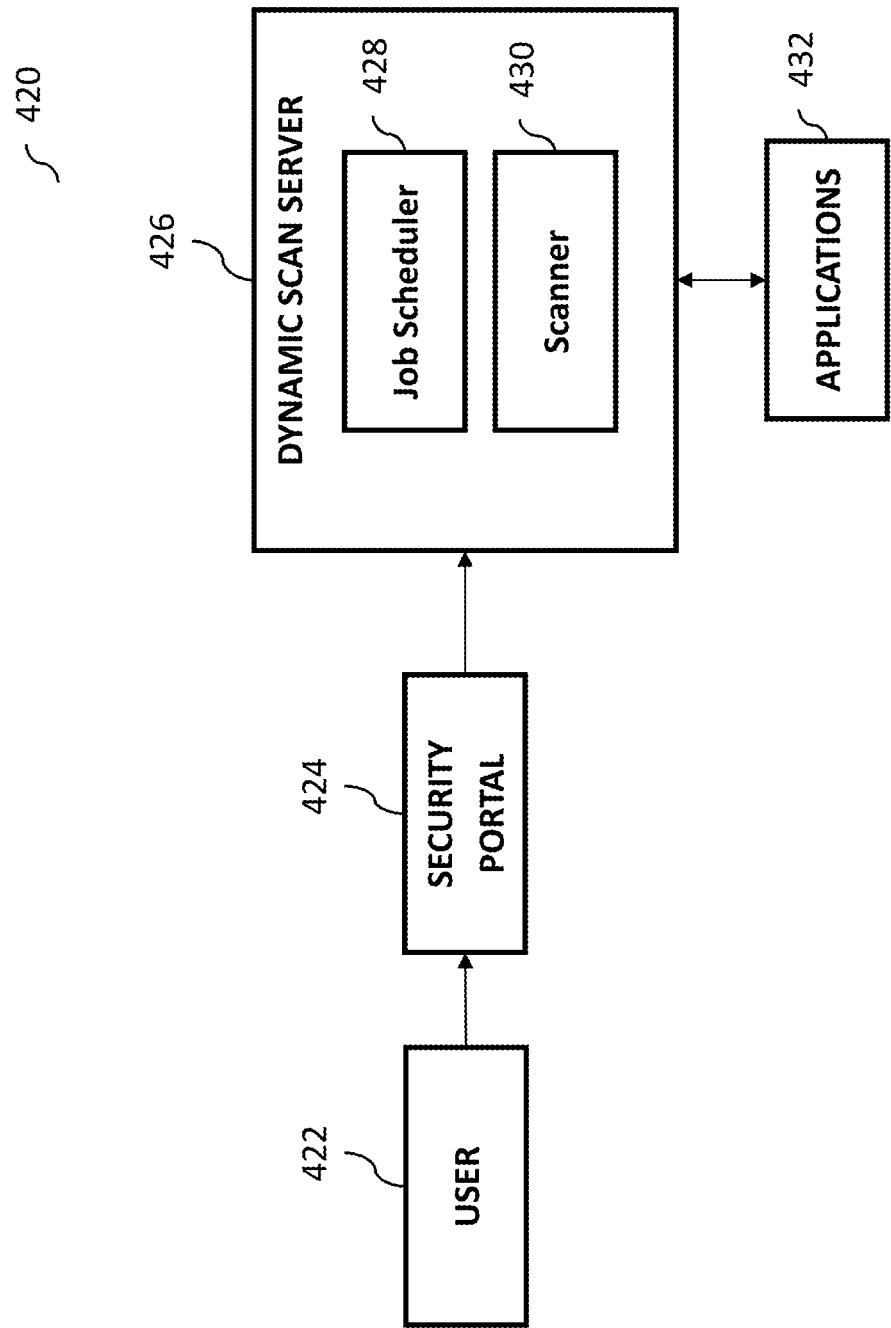
FIG. 4b illustrates an exemplary system for performing automated dynamic application security testing, according to some implementations of the current subject matter.

FIG. 4b illustrates an exemplary system 420 for performing automated dynamic application security testing, according to some implementations of the current subject matter. The system 420 may include a user 422 (e.g., an individual user, a browser plug-in, a software application, an application process, an application plug-in, a computing system, etc.), a security portal 424, a dynamic scan server 426, and one or more applications, instances, etc. processes 432. The dynamic scan server 426 may further include a job scheduler 428 and a scanner 430 (e.g., a Burp scanner (e.g., a Java process)). Once the collected HTTP requests are uploaded to the security portal 424, a new job may be queued on the dynamic scan server 426 using known job scheduling frameworks 428 (e.g., resque). In some implementations, a number of worker nodes may be implemented on the dynamic scan server 426 to process various jobs from the queue. When a job is executed, a backend scanner 430 may be invoked to process one or more security test(s) against collected HTTP requests. In some exemplary implementations, the backend scanner 430 may be an extended version of a Burp Scanner, which may be configured to fully automating login, CSRF token replacement, cookie(s) update, etc.

Figure 5:
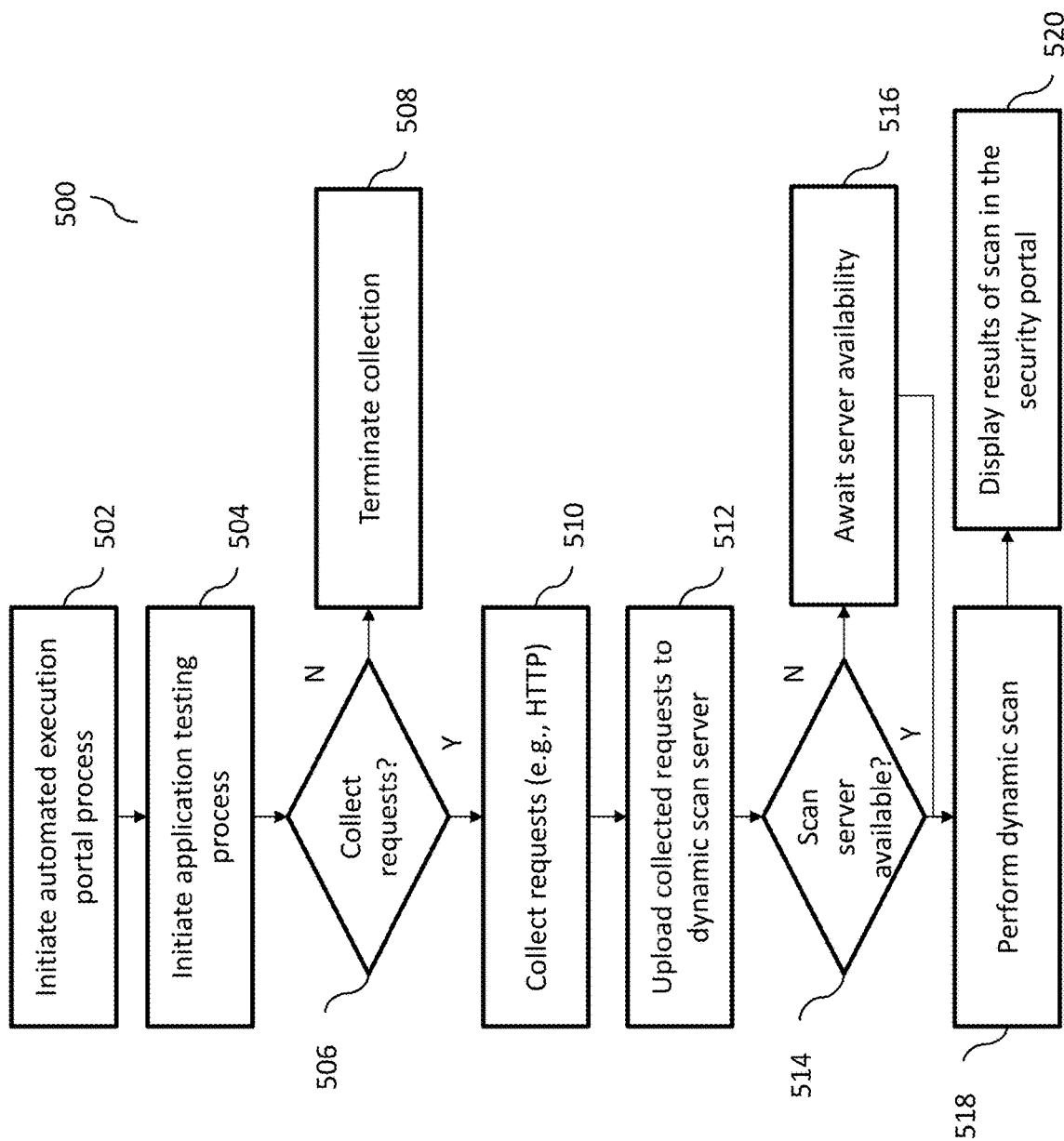
FIG. 5 illustrates an exemplary process for performing automated dynamic application security testing, according to some implementations of the current subject matter.

FIG. 5 illustrates an exemplary process 500 for performing automated dynamic application security testing, according to some implementations of the current subject matter. The process 500 may be performed by one or more components of the system 400 shown in FIG. 4a (or the system 420 shown in FIG. 4b). Referring back to FIG. 5 (and FIG. 4a; similar description will be applicable to FIG. 4b), at 502, the automated execution portal 410 may be initiated. The processes performed by the engine 412 of the portal 410 may be initiated upon receiving a request from the user device 402 directed to the application 408. The request may be an HTTP request, a query, an opening of a particular user interface, accessing an application icon on the user's device, and/or by any other means. The user device 402 may include a plug-in component that may be configured to detect user's action and transmit a trigger to the automated execution portal 410 to initiate its operation.

At 504, the application testing process may be initiated. In some exemplary non-limiting implementations, various Selenium testing framework's processes may be executed for the purposes of testing one or more processes of the application 408 that the user device wishes to access. In some implementations, the dynamic scan server 404 may be configured to receive a trigger indicating that requests may be transmitted to it for scanning/testing purposes.

At 506, the plug-in installed (e.g., testNG plugin) on the user device 402 may be configured to monitor user's actions to determine whether requests generated by the user device 402 may need to be collected for the testing/scanning by the server 404. If the request are not to be collected, the plug-in may terminate any collection processes, at 508.

If the requests are to be collected, the plug-in at the user device 402 may be configured to collect the requests, at 510. The collected requests may be stored in memory of the device 402 that may be specifically allocated for that purpose. In some implementations, the collected requests may be grouped by processes, applications, user, and/or in any other desired ways for storage.

At 512, the collected requests may be transmitted and/or uploaded to the dynamic scan server 404. In some implementations, the uploaded requests may be stored in the server's memory and, once scanned/tested, may be deleted/purged in order to make the memory available for future requests.

In some implementations, the process 500 may determine whether the server 404 is available for scanning/testing purposes, at 514. If the server 404 is not available, the process 500 may be configured to await availability of the server 404, at 516. Once the server 404 becomes available, the server 404 may perform a scan/test of the uploaded requests, at 518. Upon completion of the scan, the server 404 may generate and transmit a report. The report may indicate whether all scanned/tested requests are clear (i.e., no vulnerabilities, threats, etc. are found), whether vulnerabilities/threats are found and/or whether what, if any, actions may be taken to address such vulnerabilities/threats. The report may be displayed in the security portal 406, at 520.

As shown in FIG. 4b, the dynamic scan server 426 may include the job scheduler server 428 to process the jobs scheduled through security portal 424. The security portal 424 may be a web portal that may provide a user interface for reviewing of the report identifying any threats/vulnerabilities. User(s) may access the portal through any user device (e.g., a browser, a mobile device, etc.).

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 6:
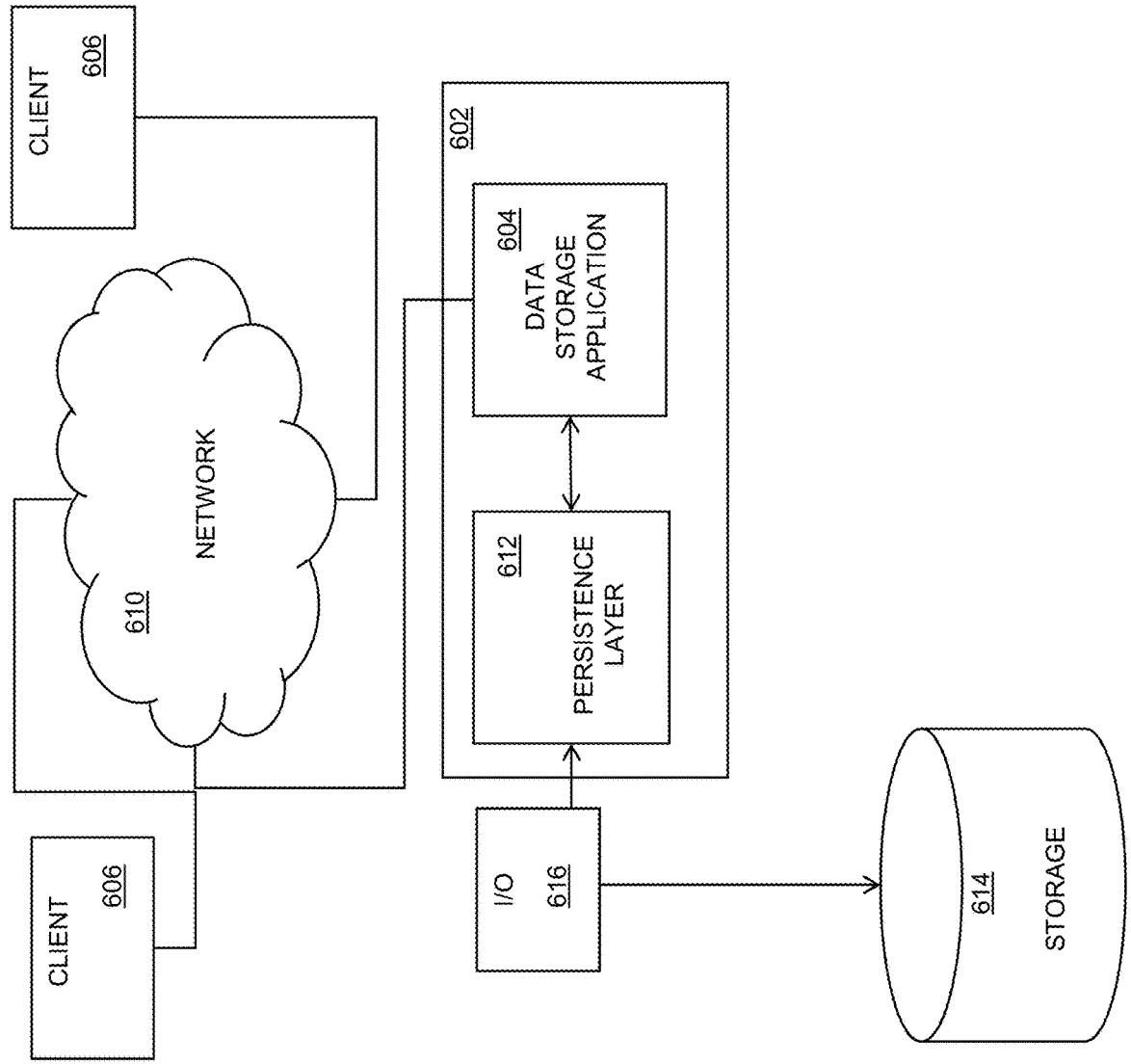
FIG. 6 is a diagram illustrating an exemplary system including a data storage application, according to some implementations of the current subject matter.

FIG. 6 illustrates an exemplary system 600 in which a computing system 602, which may include one or more programmable processors that may be collocated, linked over one or more networks, etc., executes one or more modules, software components, or the like of a data storage application 604, according to some implementations of the current subject matter. The data storage application 604 may include one or more of a database, an enterprise resource program, a distributed storage system (e.g. NetApp Filer available from NetApp of Sunnyvale, Calif.), or the like.

The one or more modules, software components, or the like may be accessible to local users of the computing system 602 as well as to remote users accessing the computing system 602 from one or more client machines 606 over a network connection 610. One or more user interface screens produced by the one or more first modules may be displayed to a user, either via a local display or via a display associated with one of the client machines 606. Data units of the data storage application 604 may be transiently stored in a persistence layer 612 (e.g., a page buffer or other type of temporary persistency layer), which may write the data, in the form of storage pages, to one or more storages 614, for example via an input/output component 616. The one or more storages 614 may include one or more physical storage media or devices (e.g. hard disk drives, persistent flash memory, random access memory, optical media, magnetic media, and the like) configured for writing data for longer term storage. It should be noted that the storage 614 and the input/output component 616 may be included in the computing system 602 despite their being shown as external to the computing system 602 in FIG. 6.

Data retained at the longer term storage 614 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 7:
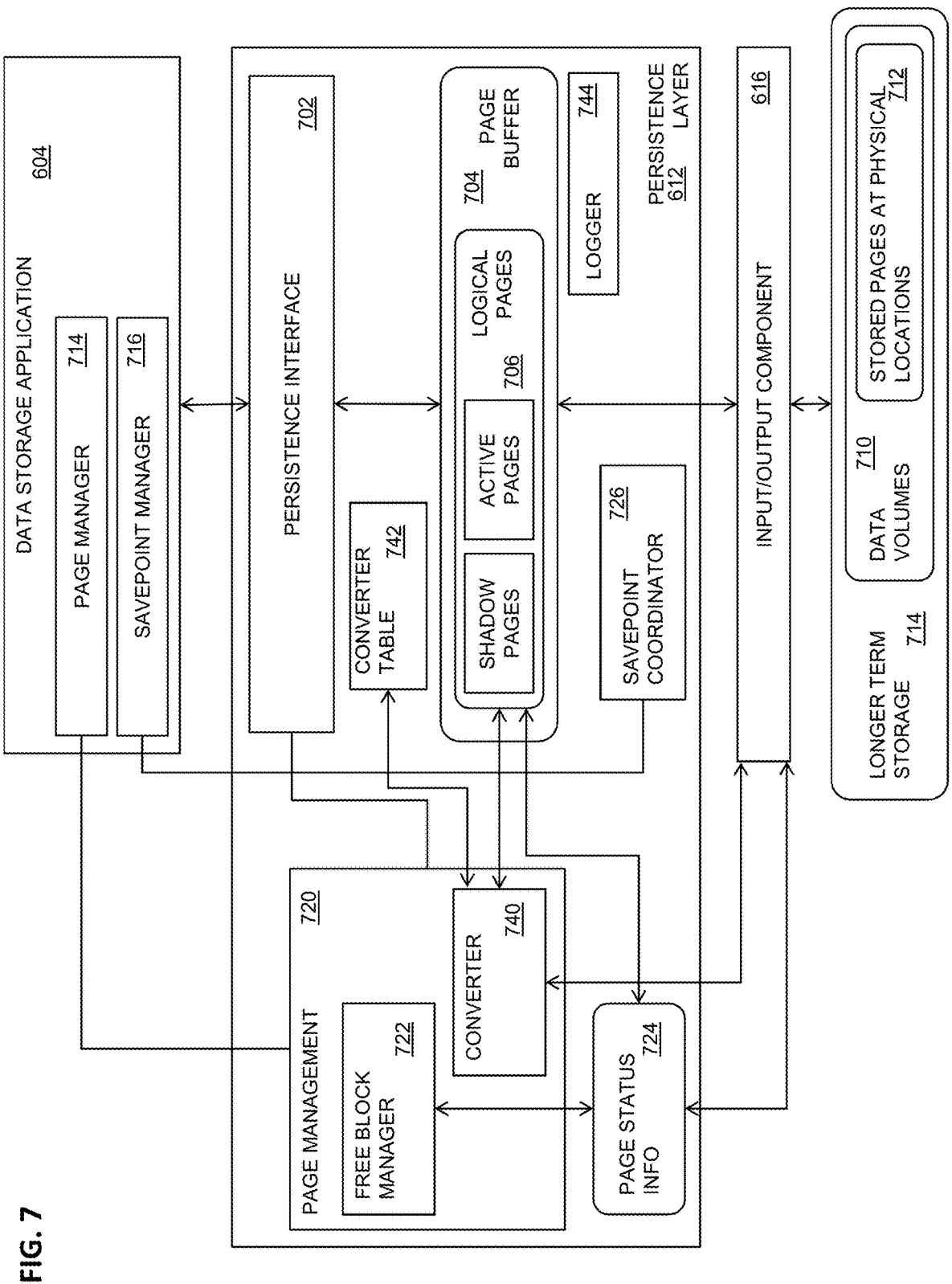
FIG. 7 is a diagram illustrating details of the system of FIG. 6.

FIG. 7 illustrates exemplary software architecture 700, according to some implementations of the current subject matter. A data storage application 604, which may be implemented in one or more of hardware and software, may include one or more of a database application, a network-attached storage system, or the like. According to at least some implementations of the current subject matter, such a data storage application 604 may include or otherwise interface with a persistence layer 612 or other type of memory buffer, for example via a persistence interface 702. A page buffer 704 within the persistence layer 612 may store one or more logical pages 706, and optionally may include shadow pages, active pages, and the like. The logical pages 706 retained in the persistence layer 612 may be written to a storage (e.g. a longer term storage, etc.) 614 via an input/output component 616, which may be a software module, a sub-system implemented in one or more of software and hardware, or the like. The storage 614 may include one or more data volumes 710 where stored pages 712 are allocated at physical memory blocks.

In some implementations, the data storage application 604 may include or be otherwise in communication with a page manager 714 and/or a savepoint manager 716. The page manager 714 may communicate with a page management module 720 at the persistence layer 612 that may include a free block manager 722 that monitors page status information 724, for example the status of physical pages within the storage 614 and logical pages in the persistence layer 612 (and optionally in the page buffer 704). The savepoint manager 716 may communicate with a savepoint coordinator 726 at the persistence layer 612 to handle savepoints, which are used to create a consistent persistent state of the database for restart after a possible crash.

In some implementations of a data storage application 604, the page management module of the persistence layer 612 may implement a shadow paging. The free block manager 722 within the page management module 720 may maintain the status of physical pages. The page buffer 704 may include a fixed page status buffer that operates as discussed herein. A converter component 740, which may be part of or in communication with the page management module 720, may be responsible for mapping between logical and physical pages written to the storage 614. The converter 740 may maintain the current mapping of logical pages to the corresponding physical pages in a converter table 742. The converter 740 may maintain a current mapping of logical pages 706 to the corresponding physical pages in one or more converter tables 742. When a logical page 706 is read from storage 614, the storage page to be loaded may be looked up from the one or more converter tables 742 using the converter 740. When a logical page is written to storage 614 the first time after a savepoint, a new free physical page is assigned to the logical page. The free block manager 722 marks the new physical page as "used" and the new mapping is stored in the one or more converter tables 742.

The persistence layer 612 may ensure that changes made in the data storage application 604 are durable and that the data storage application 604 may be restored to a most recent committed state after a restart. Writing data to the storage 614 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 744 may also be included to store the changes made to the data of the data storage application in a linear log. The logger component 744 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 744 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 612 may use a combination of undo log entries (from one or more logs) and shadow paging.

The persistence interface 702 may handle read and write requests of stores (e.g., in-memory stores, etc.). The persistence interface 702 may also provide write methods for writing data both with logging and without logging. If the logged write operations are used, the persistence interface 702 invokes the logger 744. In addition, the logger 744 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 744. For an entry of type "update", for example, this would be the identification of the affected record and the after image of the modified data.

When the data application 604 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 744 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 744 may write a database log (or simply referred to herein as a "log") sequentially into a memory buffer in natural order (e.g., sequential order, etc.). If several physical hard disks/storage devices are used to store log data, several log partitions may be defined. Thereafter, the logger 744 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 604 may use shadow paging so that the savepoint manager 716 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 8:
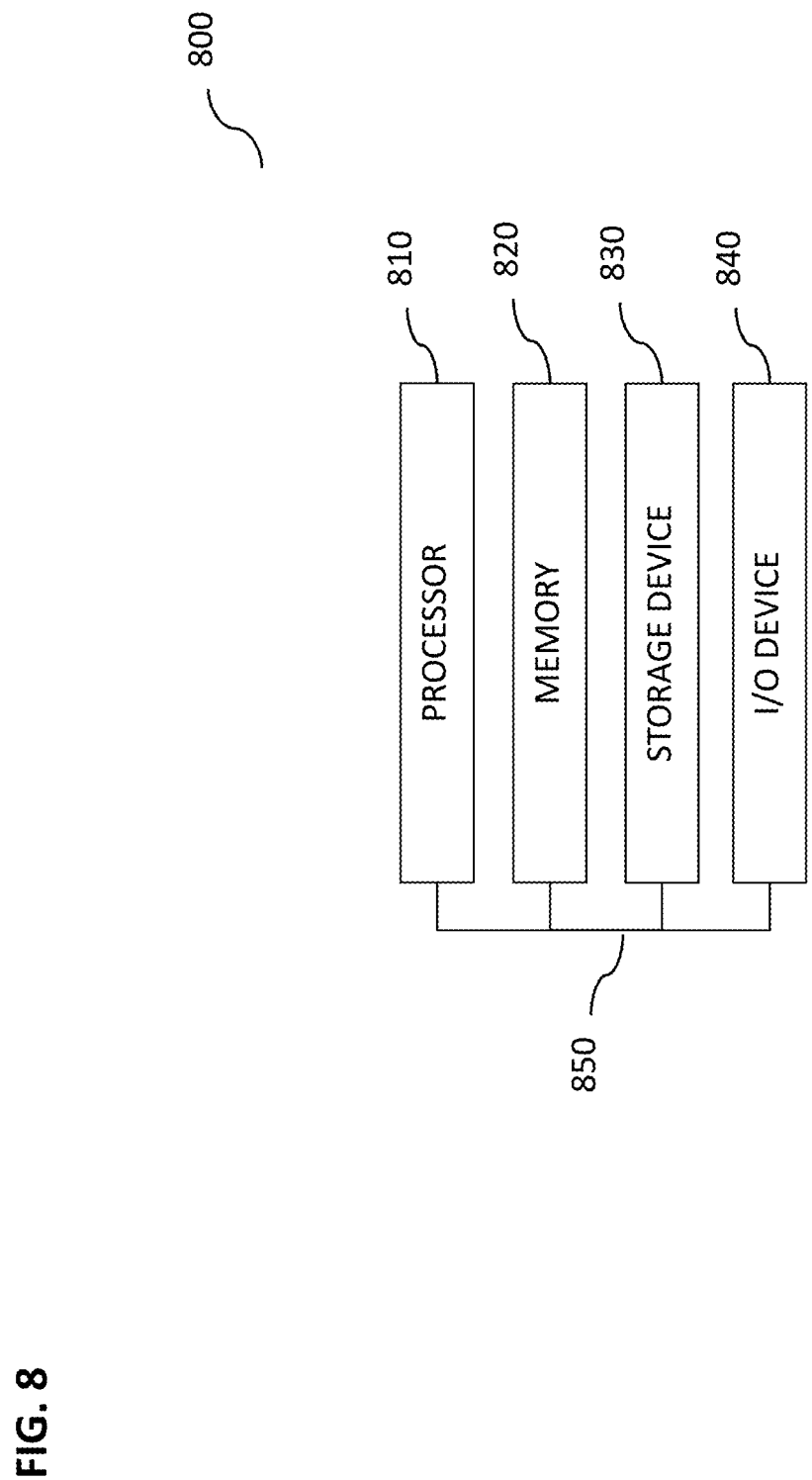
FIG. 8 is an exemplary system, according to some implementations of the current subject matter.

In some implementations, the current subject matter may be configured to be implemented in a system 800, as shown in FIG. 8. The system 800 may include a processor 810, a memory 820, a storage device 830, and an input/output device 840. Each of the components 810, 820, 830 and 840 may be interconnected using a system bus 850. The processor 810 may be configured to process instructions for execution within the system 800. In some implementations, the processor 810 may be a single-threaded processor. In alternate implementations, the processor 810 may be a multi-threaded processor. The processor 810 may be further configured to process instructions stored in the memory 820 or on the storage device 830, including receiving or sending information through the input/output device 840. The memory 820 may store information within the system 800. In some implementations, the memory 820 may be a computer-readable medium. In alternate implementations, the memory 820 may be a volatile memory unit. In yet some implementations, the memory 820 may be a non-volatile memory unit. The storage device 830 may be capable of providing mass storage for the system 800. In some implementations, the storage device 830 may be a computer-readable medium. In alternate implementations, the storage device 830 may be a floppy disk device, a hard disk device, an optical disk device, a tape device, non-volatile solid state memory, or any other type of storage device. The input/output device 840 may be configured to provide input/output operations for the system 800. In some implementations, the input/output device 840 may include a keyboard and/or pointing device. In alternate implementations, the input/output device 840 may include a display unit for displaying graphical user interfaces.

Figure 9:
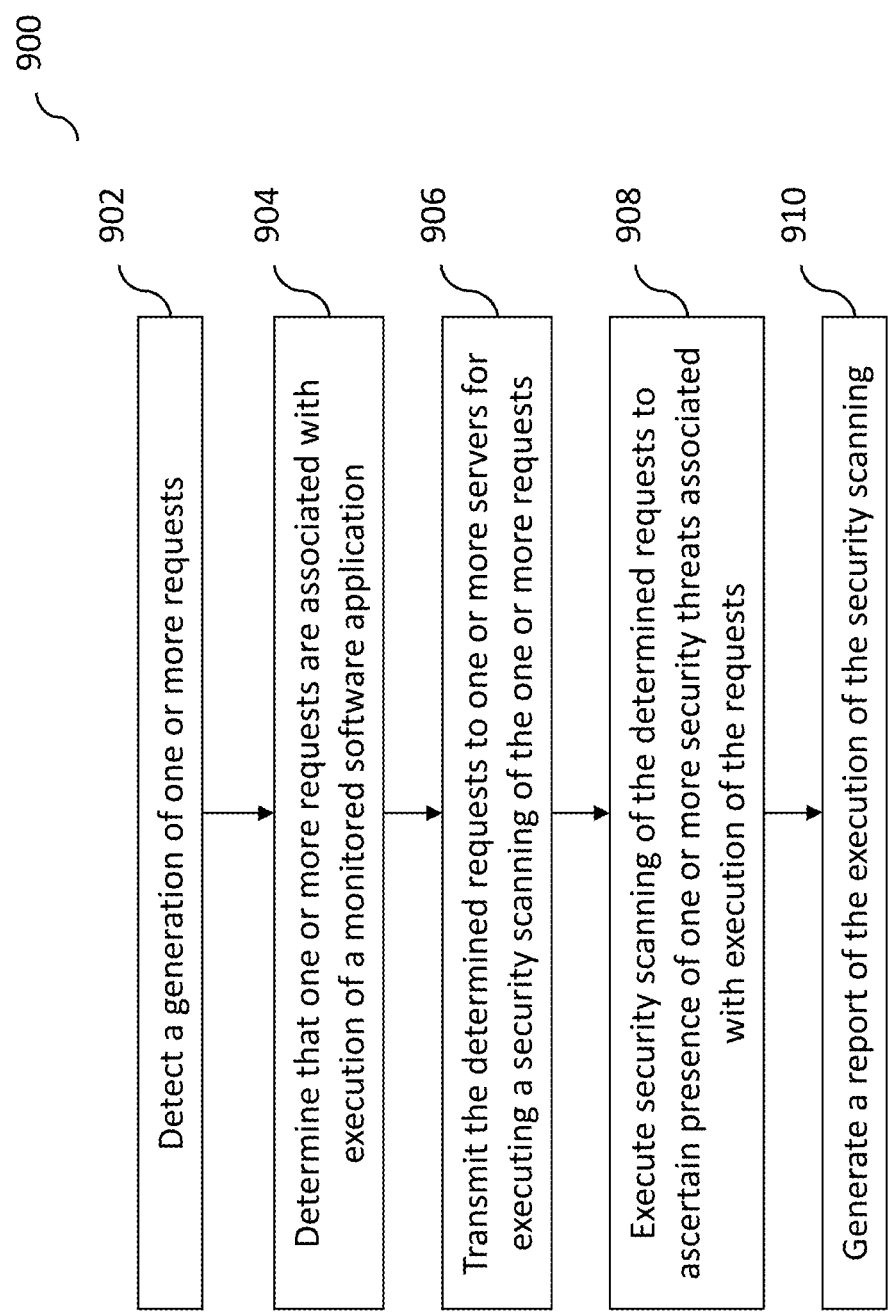
FIG. 9 is an exemplary method, according to some implementations of the current subject matter.

FIG. 9 illustrates an exemplary method 900 for performing automated dynamic security testing of software applications, according to some implementations of the current subject matter. At 902, a generation of one or more requests may be detected. The requests may be generated by one or more user devices. At 904, a determination may be made that one or more requests may be associated with execution of a monitored software application. At 906, the determined requests may be transmitted to one or more servers for executing a security scanning of the requests. At 908, security scanning of the determined requests may be performed to determine presence of one or more security threats associated with execution of the requests. At 910, a report of the execution of the security scanning may be generated.

In some implementations, the current subject matter may include one or more of the following optional features. In some implementations, one or more plug-in components may be configured to perform the detecting of the generation of the one or more requests.

In some implementations, the requests may include a hypertext transfer protocol request and the monitored software application may be a web application.

In some implementations, the method may further include graphically displaying the generated report. The generated report may be displayed using a security portal communicatively coupled to the one or more servers.

In some implementations, the method may also include selecting a server to perform the executing of the security scanning of the determined requests to ascertain presence of one or more security threats associated with execution of the requests. At least one of the detecting, the determining, the transmitting, the executing, and the generating may be performed automatically.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   detecting, using a first plug-in computing component, a generation of a plurality of requests, the plurality of requests being generated by one or more user devices, and transmitting a trigger to one or more servers for initiating a securing scanning and testing of the plurality of requests;
   determining, based on the initiating, that the plurality of requests are associated with execution of a monitored software application;
   configuring a second plug-in computing component to automatically monitor and collect one or more requests in the plurality of requests;
   grouping, using the second plug-in computing component, the one or more collected requests and storing the grouped one or more collected requests in a memory location of the one or more user devices, the second plug-in computing component is configured to group the one or more collected requests using at least one of the following: a type of process associated with the one or more collected requests, the monitored software application, the one or more user devices, and any combination thereof;
   transmitting the grouped one or more requests to the one or more servers for execution of the security scanning and testing of the grouped one or more requests;
   selecting, using the second plug-in computing component, a server in the one or more servers to perform the execution of the security scanning and testing of the grouped one or more requests to determine presence of one or more security threats associated with execution of at least one request in the grouped one or more requests, the server being selected based on a processing availability of the server;
   executing, using the selected server, the security scanning and testing of the grouped one or more requests to determine the presence of the one or more security threats associated with the execution of the at least one request in the grouped one or more requests, wherein, based on the configuring of the second plug-in computing component, at least one request in the one or more requests is excluded from the securing scanning and testing, the securing scanning and testing is automated utilizing at least one of the following: an unit testing of a class in isolation, an integration testing of an entire computing system including several classes, and any combination thereof; and
   generating a report of the executing of the security scanning and testing.

2. The method according to claim 1, wherein the one or more requests includes a hypertext transfer protocol request and the monitored software application is a web application.

3. The method according to claim 1, further comprising graphically displaying the generated report.

4. The method according to claim 3, wherein the generated report is displayed using a security portal communicatively coupled to the one or more servers.

5. The method according to claim 1, wherein at least one of the detecting, the determining based on the initiating, the transmitting of the grouped one or more requests, the executing using the selected server, and the generating of the report is performed automatically.

6. A system comprising:
   at least one programmable processor; and
   a non-transitory machine-readable medium storing instructions that, when executed by the at least one programmable processor, cause the at least one programmable processor to perform operations comprising:
   detecting, using a first plug-in computing component, a generation of a plurality of requests, the plurality of requests being generated by one or more user devices, and transmitting a trigger to one or more servers for initiating a securing scanning and testing of the plurality of requests;
   determining, based on the initiating, that the plurality of requests are associated with execution of a monitored software application;
   configuring a second plug-in computing component to automatically monitor and collect one or more requests in the plurality of requests;
   grouping, using the second plug-in computing component, the one or more collected requests and storing the grouped one or more collected requests in a memory location of the one or more user devices, the second plug-in computing component is configured to group the one or more collected requests using at least one of the following: a type of process associated with the one or more collected requests, the monitored software application, the one or more user devices, and any combination thereof;

transmitting the grouped one or more requests to the one or more servers for execution of the security scanning and testing of the grouped one or more requests;

selecting, using the second plug-in computing component, a server in the one or more servers to perform the execution of the security scanning and testing of the grouped one or more requests to determine presence of one or more security threats associated with execution of at least one request in the grouped one or more requests, the server being selected based on a processing availability of the server;

executing, using the selected server, the security scanning and testing of the grouped one or more requests to determine the presence of the one or more security threats associated with the execution of the at least one request in the grouped one or more requests, wherein, based on the configuring of the second plug-in computing component, at least one request in the one or more requests is excluded from the securing scanning and testing, the securing scanning and testing is automated utilizing at least one of the following: an unit testing of a class in isolation, an integration testing of an entire computing system including several classes, and any combination thereof; and generating a report of the executing of the security scanning and testing.

7. The system according to claim 6, wherein the one or more requests includes a hypertext transfer protocol request and the monitored software application is a web application.

8. The system according to claim 6, wherein the operations further comprise graphically displaying the generated report.

9. The system according to claim 8, wherein the generated report is displayed using a security portal communicatively coupled to the one or more servers.

10. The system according to claim 6, wherein at least one of the detecting, the determining based on the initiating, the transmitting of the grouped one or more requests, the executing using the selected server, and the generating of the report is performed automatically.

11. A computer program product comprising a non-transitory machine-readable medium storing instructions that, when executed by at least one programmable processor, cause the at least one programmable processor to perform operations comprising:

detecting, using a first plug-in computing component, a generation of a plurality of requests, the plurality of requests being generated by one or more user devices, and transmitting a trigger to one or more servers for initiating a securing scanning and testing of the plurality of requests;

determining, based on the initiating, that the plurality of requests are associated with execution of a monitored software application;

configuring a second plug-in computing component to automatically monitor and collect one or more requests in the plurality of requests;

grouping, using the second plug-in computing component, the one or more collected requests and storing the grouped one or more collected requests in a memory location of the one or more user devices, the second plug-in computing component is configured to group the one or more collected requests using at least one of the following: a type of process associated with the one or more collected requests, the monitored software application, the one or more user devices, and any combination thereof;

transmitting the grouped one or more requests to the one or more servers for execution of the security scanning and testing of the grouped one or more requests;

selecting, using the second plug-in computing component, a server in the one or more servers to perform the execution of the security scanning and testing of the grouped one or more requests to determine presence of one or more security threats associated with execution of at least one request in the grouped one or more requests, the server being selected based on a processing availability of the server;

executing, using the selected server, the security scanning and testing of the grouped one or more requests to determine the presence of the one or more security threats associated with the execution of the at least one request in the grouped one or more requests, wherein, based on the configuring of the second plug-in computing component, at least one request in the one or more requests is excluded from the securing scanning and testing, the securing scanning and testing is automated utilizing at least one of the following: an unit testing of a class in isolation, an integration testing of an entire computing system including several classes, and any combination thereof; and generating a report of the executing of the security scanning and testing.

12. The computer program product according to claim 11, wherein the one or more requests includes a hypertext transfer protocol request and the monitored software application is a web application.

13. The computer program product according to claim 11, wherein the operations further comprise graphically displaying the generated report, wherein the generated report is displayed using a security portal communicatively coupled to the one or more servers.

14. The computer program product according to claim 11, wherein at least one of the detecting, the determining based on the initiating, the transmitting of the grouped one or more requests, the executing using the selected server, and the generating of the report is performed automatically.

* * * * *